United States Patent

[11] 3,556,282

| [72] | Inventor | Wilhelm Moeltzner |
| | | 148 Eichkampstr 1, Berlin, Germany |
| [21] | Appl. No. | 761,492 |
| [22] | Filed | Sept. 23, 1968 |
| [45] | Patented | Jan. 19, 1971 |
| [32] | Priority | Oct. 2, 1967 |
| [33] | | Germany |
| [31] | | 1,556,096 |

[54] DEVICE FOR TRANSFERRING MOLDED PARTS
19 Claims, 19 Drawing Figs.

[52] U.S. Cl. .................................................. 198/33, 198/131, 198/54
[51] Int. Cl. .................................................. B65g 47/24
[50] Field of Search .......................................... 198/53, 54, 55, 131, 33.4, 30, 45, 34, 167, 188; 221/68

[56] References Cited
UNITED STATES PATENTS

| 815,707 | 3/1906 | Hutchison ................. | 198/131 |
| 1,006,455 | 10/1911 | Barnes ..................... | 198/131 |
| 2,315,880 | 4/1943 | Stiles ....................... | 198/188X |
| 2,157,110 | 5/1939 | Bock et al. ................ | 198/53 |
| 2,931,292 | 4/1960 | Ackley ..................... | (198/53UX) |
| 3,150,765 | 9/1964 | Ellis ......................... | 198/131 |
| 3,314,519 | 4/1967 | Kelly ........................ | 198/167X |
| 3,367,534 | 2/1968 | Carter ...................... | 221/68 |

Primary Examiner—Hugo O. Schulz
Attorney—Mc Glew and Toren

ABSTRACT: A device for transferring molded parts is formed by an upwardly inclined multichannel conveyor for moving the molded parts from a storage bin to a downwardly inclined multitrack feed trough. At the lower end of the trough a locking mechanism releases the molded parts onto a conveyor assembly which transports them to a processing station. Individual carrier members on the first conveyor have molded recesses to conform to the molded parts. The carrier members may be formed of one or of a plurality of molded sections with each molded section being supported by a base plate secured to the conveyor.

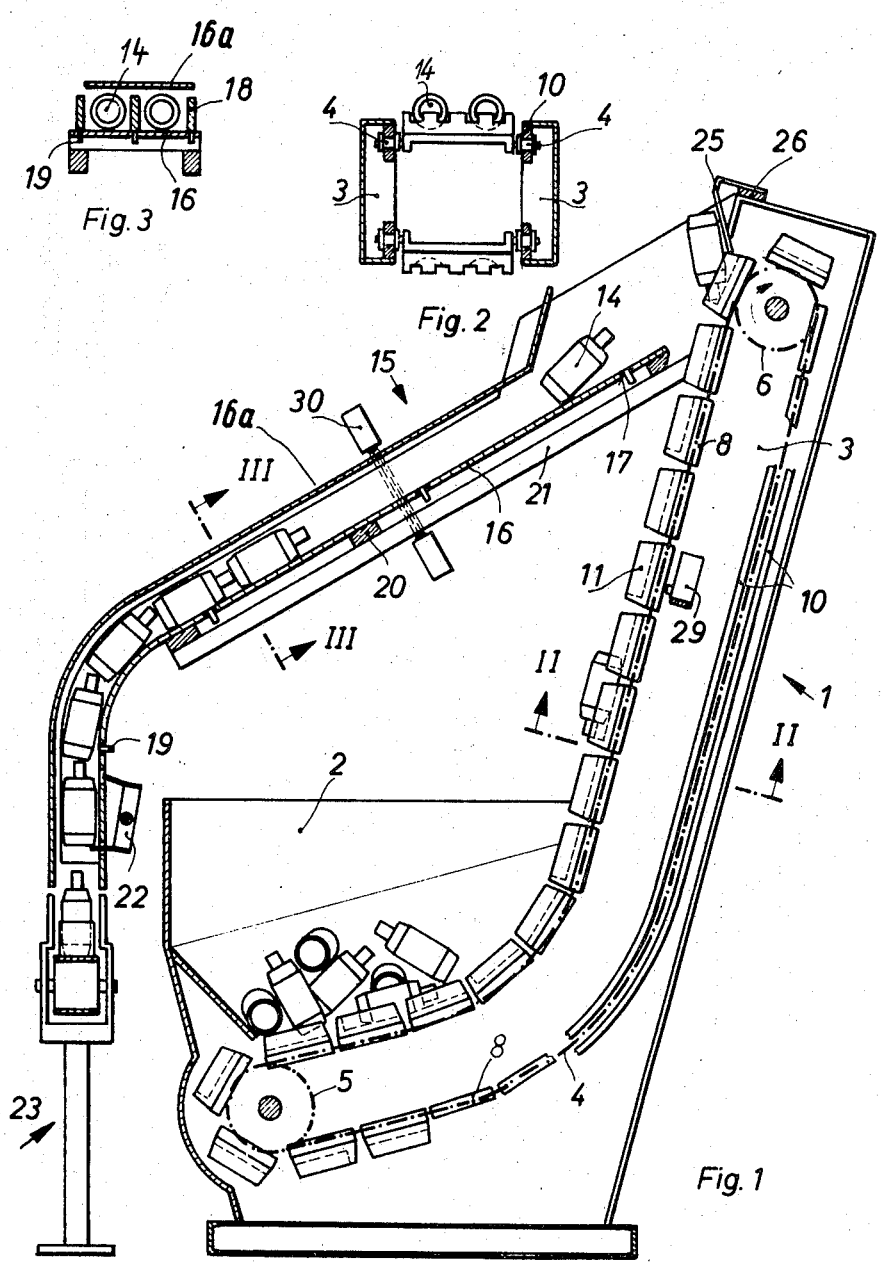

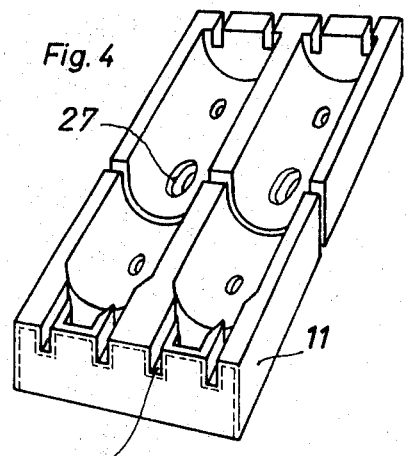
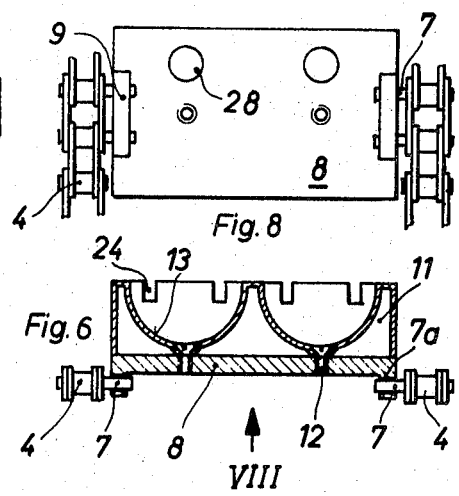
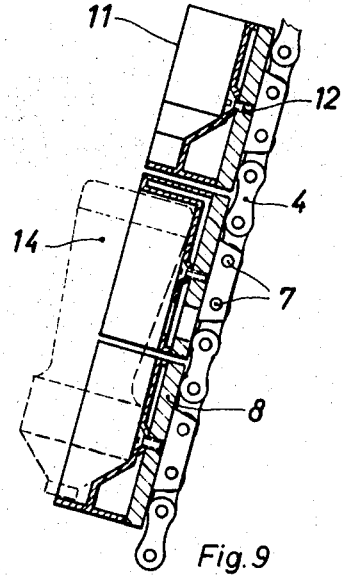
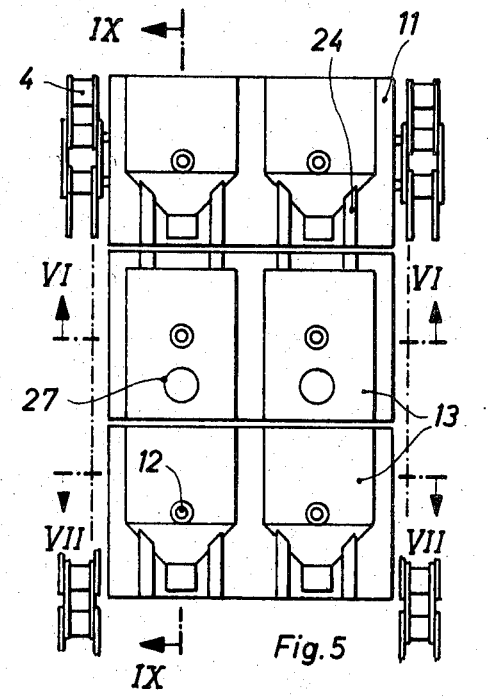
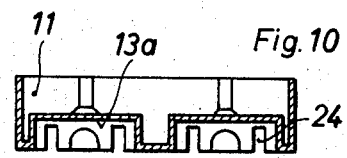
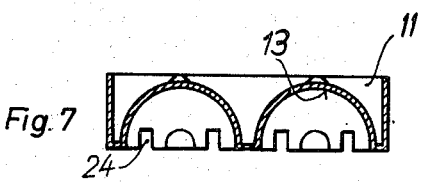

Inventor:
WILHELM MOELTZNER

BY McGlew and Toren
ATTORNEYS

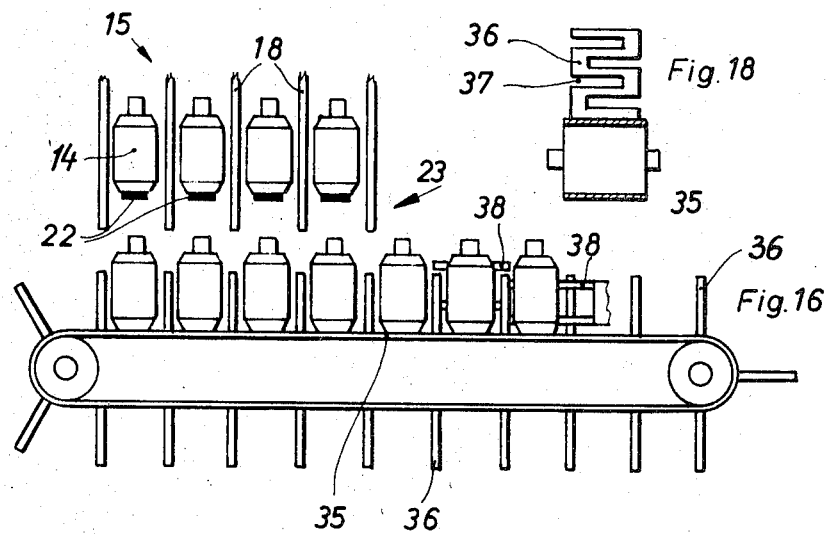
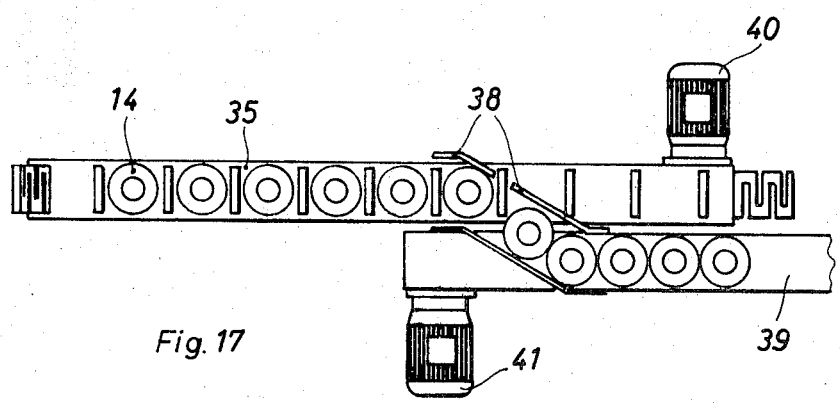
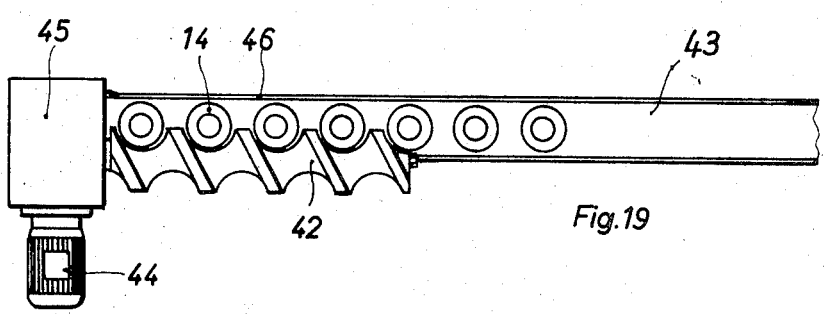

DEVICE FOR TRANSFERRING MOLDED PARTS

SUMMARY OF THE INVENTION

The present invention is directed to a device for transferring molded parts, such as bottles, cups, sleeves, cans, and the like, from a storage bin to a processing station by means of a number of conveyors and troughs, and more particularly, the invention is concerned with an upwardly inclined conveyor formed of a plurality of carrier members mounted on endless conveyor members wherein the carrier members are shaped in a recessed form conforming to at least a portion of the exterior surface of the molded part to be conveyed so that the molded part will be retained within the carrier member during its upward path of travel from the storage bin.

Vertical conveyors are preferred when work pieces are transported from a storage tank located at ground level to the upper end of a downwardly inclined feed trough for delivery either to another conveyor or directly to a processing machine. In the vertical conveyors employed in the past carriers have been used which reach under the work pieces being conveyed. However, this type of support is recommended only if screw bolts or similar types of work pieces are involved which are relatively insensitive to damage. On the other hand, if bottles, cups, sleeves, cans or the like are to be conveyed the previously utilized carriers are undesirable because they are apt to damage sensitive molded parts, particularly if the parts are formed of plastic or paper. Moreover, in the previously known apparatus complex molded parts cannot always be supported or engaged in the proper position. Where simple carriers have been used they generally require the use of additional complicated turning devices.

Another disadvantage of such conveyors is the requirement for longitudinally extending laterally positioned guides along the conveyor track to retain the material or parts being moved upwardly. The adjustment of such conveying devices for transporting molded parts of different shapes is very cumbersome and time consuming.

The primary object of the present invention is to afford an upwardly inclined conveyor for transporting molded parts which can be readily and simply reassembled for conveying molded parts of different shapes.

Another object of the invention is to provide a modular form support on the conveyor means for the carrier members for ease in assembling and disassembling the carrier members.

A further object of the invention is to utilize interchangeable molded sections for use with different carrier members having similarly shaped parts.

Still another object of the invention is to use carrier members which provide a molded shape arranged to receive and support a portion of the exterior surface of the molded part.

Moreover, another object of the invention is to provide grooves in the carrier members to be used in combination with ejector fingers for displacing the molded parts in a simple and safe manner from the upwardly inclined conveyor into a downwardly inclined trough.

A further object of the invention is to provide means for supporting the carrier members either directly from the conveyor chains or from base plates supported on the conveyor chains.

Yet another object of the invention is to provide a carrier member for the upwardly inclined conveyor in which molded parts carried in the inverted position will fall out of the conveyor and thereby avoid any down time or material loss if the molded part is improperly delivered to the processing station.

In accordance with the present invention carrier members for molded parts are provided by reverse or negative molds forming a recess having a configuration conforming to the molded part and arranged to receive and support the molded part as it is transported upwardly form a storage bin to the upper end of a downwardly inclined trough. To permit the use of the conveyor for transporting various types of molded parts the carrier members are replaceably supported on base plates secured to the conveyor chains or belts in such a manner that they can be easily replaced when the conveyor is being changed over for carrying molded parts of a different shape. These recessed carrier members provide an advantageous change over the presently used rod shaped carriers. By molding the carrier members from thin plastic sheet material they can be easily and inexpensively produced in any quantity. Where plastic material is used the carrier members are light in weight and tend to increase the weight of the conveyor belt only to a minor degree even where a large quantity of the carrier members are secured to an endless conveyor belt arrangement. The molded carrier member can be shaped to provide a recess which receives at least half of the molded part and thus provides protection against damage. Depending on the width or transverse dimension of the vertical conveyor and also on the size of the individual molded parts the molded carrier member can transport a number of molded parts arranged in side-by-side relationship on the conveyor. Accordingly, the output of the conveyor can be increased at the constant speed of travel of the conveyor belt.

In the event the conveyor belt is used to transport molded parts of a considerable length, it is advisable if the carrier members which correspond to the the overall length of the molded part are made up of a number of individual molded sections which when assembled on the conveyor form a complete carrier member. In such an arrangement each of the molded sections which make up the carrier member are secured to an individual base plate on the conveyor and travel along the conveyor is simplified. By using separate molded sections it is possible where certain basic forms are involved to use the molded sections for more than one carried member. By employing this modular construction for the carrier members the numbers of different molded sections required is reduced and stock piling is made much simpler.

In one embodiment of the invention the carrier members are provided with at least one slot shaped, longitudinally extending groove, that is the groove extends in the direction of travel of the conveyor, and is open at its forward end to permit an ejector finger to enter into the carrier member and dislodge the molded parts. In the present invention the ejector fingers are located at the upper end of the upwardly inclined conveyor and transfer the molded parts to the adjacent upper end of a downwardly inclined feed trough. The grooves are aligned with one another through the serially arranged carrier members and the carrier members move in a rectilinear path of travel past the ejector finger. In this arrangement it is impossible for the molded parts to become stuck in the carrier members at the transfer point to the feed trough.

Where frustoconically shaped cups are the molded parts being conveyed it is quite possible that they may be improperly positioned within the carrier members. If a carrier member having a frustoconically shaped recess is provided the cup can be received with either its larger diameter open rim or its smaller diameter lower portion directed into the bottom of the carrier members in their upward path of travel. If a cup is improperly oriented within the carrier member so that its bottom end is directed downwardly during the upward travel of the conveyor the bottom of the cup is not properly supported within the recess of the carrier member and its center of gravity lies outside the carrier member and, as a result, it will fall out of the conveyor and drop back into the storage bin.

Where a molded part, such as the cup, falls out of the carrier member, the carrier member remains empty during its upward travel and correspondingly the feed trough does not receive a molded part in the transfer operation at the upper end of the conveyor. As a result the height or number of molded parts within each of the separate tracks of the feed trough can vary in accordance with the transfer feed from the conveyor. Moreover, the number of molded parts within each of the tracks of the feed trough may vary.

Means are provided in the upwardly traveling conveyor to prevent any of the tracks or rows of the conveyor from being overloaded, since difficulties would develop at the transfer point from the conveyor to the downwardly inclined feed trough if more than the proper number of molded parts present themselves to the ejector device.

Where particularly lightweight parts are being transported, instead of using base plates the carrier plates or the molded sections forming the carrier plates can be secured directly to the conveyor chains. In such an arrangement catch springs secured to the chain bolts can be used to engage bores provided in the sidewalls of the carrier members. In this arrangement any one of the carrier members or its individual molded sections is secured by means of three bores.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 shows a sectional view of a portion of a device for transporting molded parts embodying the present invention;

FIG. 2 is a sectional view taken along the line II–II in FIG. 1;

FIG. 3 is a sectional view taken along the line III–III in FIG. 1;

FIG. 4 is a perspective view of a molded carrier member formed in accordance with the present invention;

FIG. 5 is a top view of three molded sections of the carrier member as shown in FIG. 4;

FIG. 6 is a sectional view taken along the line VI–VI in FIG. 5;

FIG. 7 is a sectional view taken along the line VII–VII in FIG. 5;

FIG. 8 is a bottom view of the arrangement in FIG. 6 shown in the direction of the arrow VIII;

FIG. 9 is a sectional view taken along the line IX–IX in FIG. 5;

FIG. 10 is a sectional view of an alternate embodiment of a molded carrier member such as shown in FIGS. 4 through 9;

FIG. 16 shows a device for transferring molded parts from the lower end of the trough shown in FIG. 1 to an intermittently moving conveyor belt;

FIG. 17 is a top view of the conveyor belt shown in FIG. 16 and a second conveyor belt disposed in side-by-side relationship;

FIG. 18 is a detail view of the transfer device shown in FIGS. 16 and 17; and

FIG. 19 is an alternate arrangement of apparatus for transporting molded parts received from the lower end of the feed trough in FIG. 1.

DETAILED DESCRIPTION OF THE PREFERRED EMBODIMENTS

Figure 11:
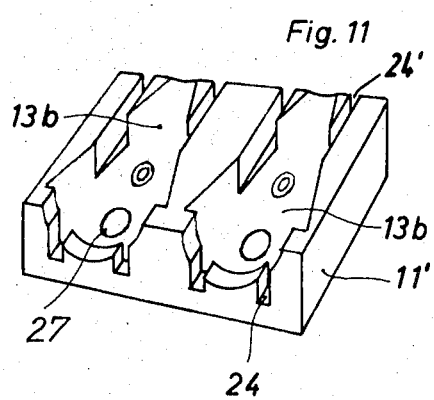
FIG. 11 is a perspective view of a molded carrier member embodying the present invention and employed for transporting frustoconically shaped cups.

In FIG. 1 a portion of a device for conveying molded parts is shown comprising an upwardly inclined conveyor 1 arranged to receive molded parts from a storage bin 2 and to convey the parts upwardly for transfer into a downwardly inclined feed trough 15. The conveyor 1 has a pair of upwardly extending side plates 3. A pair of spaced endless conveyor chains 4 are each entrained over a lower wheel 5 and an upper wheel 6, the lower wheels being located within the storage bin 2 while the upper wheels 6 are located at the upper end of the conveyor. Though not shown in the drawing the upper pair of wheels 6 are driven by an electromotor in the direction of the arrow shown within the wheel.

Each of the links of the conveyor chain has a pair of inwardly extending chain bolts extending toward the other chain. These chain bolts are arranged to fit into bores 7a formed in the sides of base plates 8, see FIGS. 6 and 8. As can best be seen in FIG. 6 the bores 7a are formed in lugs 9 extending downwardly from the lower surface of the base plate 8. During operation the chain bolts do not become disengaged from the lugs 9 of the base plates because the chains are guided by the side plates 3 and by means of the guides 10 shown extending downwardly into the storage bin.

Mounted on the base plates 8 are molded carrier members 11 which are secured onto the base plates by means of screws 12. It can be appreciated that the fastening of the carrier members 11 to the base plates 8 can be effected in a number of ways, for example by means of spring catches. As indicated by FIGS. 4, 5 and 9, the carrier members can be made up of a number of sections used being dependent upon the length of the molded part in the direction of travel of the upwardly inclined conveyor 1. As is apparent from FIG. 9, the carrier members whether made from an individual molded section or from a plurality of molded sections form a negative or reverse mold of the molded part which they are intended to convey. The carrier member forms a recess generally conforming to a portion of the exterior surface of the molded part and receives the molded part so that it is held properly in position as the conveyor travels upwardly from the storage bin 2 to the upper end of the feed trough 15. As seen in FIGS. 4 through 9, the carrier member 11 is substantially semicircular in transverse section and provides the basic form for molded parts which have a cylindrical shape. It is possible to employ these semicylindrical molded parts for various parts which may have the same general diametrical dimension though being longer or shorter in length or height. In the event a molded part of rectangular cross section is to be transported, carrier members having the shape shown in FIG. 10 can be employed, and as with the rounded or semicylindrical carrier members the rectangular carrier members 13a can be used for different molded parts having the same general cross-sectional dimensions.

As shown in FIG. 9, the base plates 8 are secured in closely spaced serial arrangement on the conveyor chains 4 and as a result the carrier members 11 or the individual molded sections 13 which make up the carrier members can be individually secured to the base plates. While the individual base plates and the molded sections of the carrier member secured to them are spaced closely together there is a sufficient spacing to permit their passage around the ends of the conveyor belt assembly.

After the upward passage of the molded parts 14 on the conveyor 1 they are transferred into the downwardly inclined feed trough 15. The feed trough 15 has a top plate 16a and a bottom plate or support 16 which is provided with a plurality of longitudinal rows of bores 17 extending for the length of the trough. By means of these bores partitions 18 can be secured to the bottom plate 16 by means of pins 19 inserted through the bores 17 into the partitions. In view of the number of rows of bores it is possible to vary the spacing of the partitions as desired in dependence upon the transverse dimension of the mold part being conveyed. Accordingly, the partitions in the feed trough can be arranged in the same spacing as the individual recesses formed in the carrier members to provide the downward tracks for the molded parts as they are transferred from the upper end of the conveyor into the feed trough. The top plate 16a maintains the molded plates within the trough. The feed trough 15 is secured by means of crossbars 20 on supports 21, see FIG. 1. The upper half of the feed trough is inclined obliquely to the vertical while the lower half extends vertically downward.

At the lower end of the feed trough 15 a known locking arrangement 22 is arranged to grip the bottom row of molded parts as they reach the discharge end of the feed trough and to release the lowermost molded parts onto the horizontally arranged conveyor device 23, see FIG. 1. The assembly for conveying the molded parts from the end of the feed trough will be described later.

Referring to FIG. 4 and the other related FIGS., the molded carrier members 11 depending upon the shape of the molded parts being conveyed, have identical slot-shaped longitudinal grooves 24 arranged on either side of the center line of the carrier member. These grooves are formed when the carrier members are being molded.

Preferably, the carrier members 11 are made from plastic sheet material, for example, of polystyrene, by deep drawing and have a wall thickness of 1 to 3 mm. depending upon the size and weight of the molded parts to be transported. As mentioned above, the slot-shaped longitudinal grooves extending through the carrier members are formed in the deep drawing process employed in forming the carrier members.

As the molded parts are conveyed upwardly within the recesses formed in the carrier members ejector fingers 25, see FIG. 1, are mounted at the upper end of the conveyor on a cross piece 26 extending between the two side plates 3. The ejector fingers 25 extend into the grooves 24 and as the conveyor belt moves upwardly the fingers lift the molded parts out of the carrier members and they are ejected, as shown in FIG. 1, and drop downwardly into the upper or inlet end of the feed trough 15.

Since it is possible that certain of the tracks or rows within the feed trough could be overloaded while others are loaded to a lesser degree the blanks or molded parts passing upwardly within the rows of carrier members on the conveyor can be ejected during the upward path of travel to eliminate the overloaded condition. To provide this ejection operation, openings 27 are provided in the carrier members along their longitudinal center lines and corresponding openings 28 are provided in the base plates, if any, through which the fingers of the ejector 29, see FIG. 1, can be extended. As an alternative to mechanical ejection it is also possible to utilize a controlled compressed air jet passing through the opening 27 and 28 for displacing the molded parts from the recesses in the carrier members. These ejection means and a corresponding control device 30, mounted on the inclined leg of the feed trough, are known per se and do not require further explanation in this description. The control device 30 can be operated, for example, either photoelectrically or with delayed switching. The delayed switching is provided so that downwardly sliding molded parts, which pass rapidly through the light beam, do not release a controlled impulse for the ejector.

Figure 13:
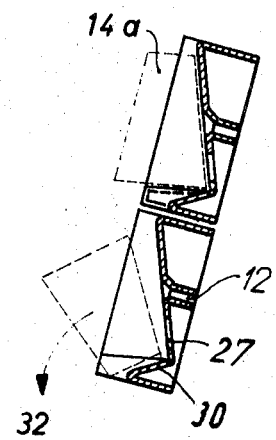
FIG. 13 is a sectional view taken along the line XIII–XIII in FIG. 12.
Figure 12:
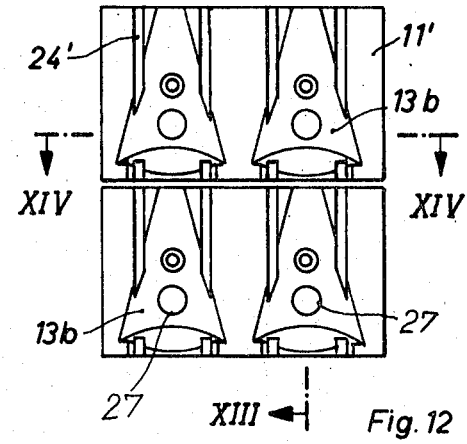
FIG. 12 is a top view of two molded carrier members such as shown in FIG. 11.
Figure 14:
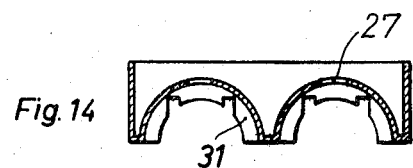
FIG. 14 is a sectional view taken along the line XIV–XIV in FIG. 12.

In FIGS. 11 through 14 a mold plate 11' is illustrated for conveying cups or similar frustoconically shaped molded parts and the negative or reverse recess 13b conforming to the shape of a portion of the surface of the cup is shown in FIGS. 11 to 13. As is best illustrated in FIG. 13, the lowermost inner surface 30 is disposed obliquely to the lower part of a cup 14a in its proper position shown in the upper half of FIG. 13. Above the lower surface 30 the recess 13b is provided with a semicircular support ring 31 adapted to receive the rim of the cup in its proper position. If a cup 14a happens to become inverted from the proper conveying position within the carrier member, its bottom end which has a smaller diameter than its rim cannot be supported within the semicircular ring 31 and as a result rests against the oblique surface 30 at the lower portion of the recess 13a. Due to the incorrect positioning of the cup its center of gravity is disposed outwardly from the recess and as the conveyor travels upwardly the cup is displaced from the recess in the direction of the arrow 32. Several cups can be stacked in proper position without dropping out. Similar to the grooves provided in the carrier members 11 grooves 24' are also provided in the carrier members 11' for displacing the molded cups after the completion of their passage upwardly on the conveyors.

Figure 15:
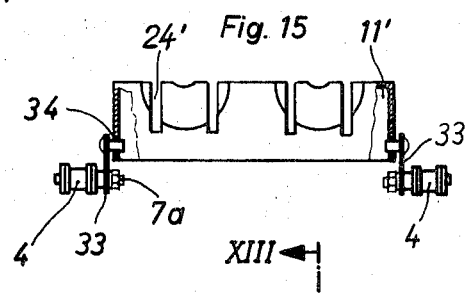
FIG. 15 is a sectional view disclosing an alternate arrangement for securing the molded carrier members to a conveyor chain belt arrangement.

In FIG. 15 a simplified arrangement is illustrated for securing the mold plates 11' onto the chains 4 of the conveyor. In the arrangement previously described the chain bolts 7 are fitted into the bores 7a in the lugs 9 on the base plate, however, in this arrangement the base plates are omitted, and instead the chain bolts 7a are secured to the carrier members 11' by means of catch springs 33 secured by nuts onto the chain bolts 7a. Each side of the carrier members 11' have two bores 34 within which the catch springs 33 are secured. This fastening method is adequate where extremely lightweight molded parts are being transported.

In FIGS. 16 to 19 two different embodiments of transfer means are illustrated for use in combination with the conveyor 1 and feed trough 15 shown in FIG. 1.

In FIG. 16 the lower end of the feed trough 15 is represented by the lowermost ends of four tracks through the feed trough which are formed by the sidewalls of the trough and three intermediate partitions 18. The locking mechanism 22 secures the molded parts 14 within the trough tracks until the molded parts which have been previously deposited on the conveyor 35 have been moved ahead.

Located below the feed trough 15 is a conveyor belt 35 which moves in steps corresponding to the number of molded parts which are being fed onto it from the superposed discharge end of the feed trough 15. The conveyor belt 35 is spaced below the discharge end of the feed trough and is provided with partitions 36 located between the individual molded parts to prevent them from being displaced or tipped when they are deposited on the conveyor belt. These partitions may be adjusted with respect to their lateral spacing depending on the relative dimension of the molded parts to be placed between them.

In FIG. 18, a detail is shown of the partitions 36 and a pair of transverse slots 37 extend inwardly from each side of the partitions toward the opposite side of the partition. These slots are arranged to receive the rod shaped guides 38, note FIGS. 16 and 17, which extend obliquely with respect to the direction of motion of the conveyor belt 35 and its adjacent conveyor belt 39. As the molded parts are moved along on the conveyor belt 35 they engage the guides 38 and are transferred to the belt 39. The conveyor belt 39 is driven at the same speed as the other conveyor belt, but is driven continuously. In FIG. 17 the drive motors 40, 41 are indicated for the conveyor belts 35, 39, respectively. Since the molded parts arrive at the transfer point between the two belts at the same speed at which they are removed by the second conveyor belt there is no tendency on the part of the molded parts to tip over. From the conveyor belt 39 the molded parts are fed to a processing station, not shown, as for an example, a filling machine or a pressurizing device.

In FIG. 19 a second embodiment of a transfer device for receiving molded parts from the feed trough 15 is indicated. Spaced below the feed trough 15 is a conveyor screw 42 and a conveyor belt 43 arranged beneath the screw. Both the conveyor screw and the conveyor belt are driven continuously at the same speed. The driving motor 44 acts over an intermediate gear 45 both on the conveyor screw and on the conveyor belt. The pitch of the conveyor screw corresponds to the intervals of the partitions 36 shown on the conveyor belt 35 in FIGS. 16 and 17. The pitch and configuration of the screw is arranged so that about half of the molded part is received within the screw and on the opposite side the molded parts bear against a guide rail 46. As the molded parts pass from the end of the conveyor screw they continue their passage on the conveyor belt which is moving at the same speed and avoid the problem of being tipped or knocked from the belt. As with conveyor belt 39 in FIG. 17, the belt 43 moves the molded parts to a processing station.

I claim:

1. A device for transferring molded parts in a specific orientation from a storage container where the parts are disposed in a random arrangement to a processing station comprising an endless conveyor member for conveying similarly shaped hollow molded parts in an upwardly inclined path from the storage container, a plurality of serially arranged carrier members removably secured to said conveyor member and arranged to receive individual molded parts in a specific orientation for retaining the molded parts during the upward passage of said conveyor member, each of said carrier members comprising at least one continuous recess molded section extending in the direction of travel of said carrier member and having a configuration within the recessed molded section conforming to the shape of a substantial portion of the longitudinally extending exterior periphery of the molded part being conveyed so that a molded part properly oriented in said recessed molded section is retained therein during the upward travel of said conveyor member but if the molded part is not properly oriented, it is displaced as said conveyor member proceeds in the upward direction, and means located at the upper end of said conveyor member for displacing the molded parts from said recessed molded sections in said carrier members for directing the molded parts in a specific orientation to the processing station.

2. A device, as set forth in claim 1, wherein said endless conveyor member comprises a pair of laterally spaced endless conveyor chains, chain bolts extending inwardly from said chains toward the oppositely disposed said chain belt, a plurality of base plates secured to said conveyor chains by means of said chain bolts fitted within openings in the sides of said base plates and each of said carrier members is removably secured to at least one of said base plates.

3. A device, as set forth in claim 2, wherein each of said carrier members comprises a plurality of separate carrier sections disposed in serial arrangement on said conveyor member with each said conveyor member section removably secured to a different one of said base plates, and each of said conveyor member sections providing a longitudinally extending portion of said continuous recess molded section in said carrier member.

4. A device, as set forth in claim 3, wherein each said carrier member section containing a plurality of recessed molded sections arranged in side-by-side relationship for forming a plurality of rows of carrier members when assembled on said conveyor member.

5. A device, as set forth in claim 1, wherein each of said carrier members has a longitudinally extending groove formed therein extending through the ends of said carrier members into said recessed molded sections, and said means located at the upper end of said conveyor member are arranged to pass through said grooves in displacing the molded parts from said carrier members.

6. A device, as set forth in claim 1, wherein said carrier member is formed of thin plastic sheet material which is deep drawn for forming said recessed molded section therein, and said sheet material having a thickness of about 1 to 3 mm.

7. A device, as set forth in claim 1, wherein said carrier member is adapted to transfer frustoconically shaped molded parts, the recessed molded section of said carrier members has a configuration conforming to the shape of the frustoconically shaped molded parts and is arranged on said conveying means to receive the molded parts with the larger diameter ends thereof in the downwardly directed position in the upward path of travel of said conveyor means, a semicircular support shoulder formed adjacent the end of the recessed molded section of said carrier member which is in the rearward position as said carrier member travels upwardly on said conveyor means, said shoulder arranged to support the larger diameter end of the molded part and the radius of the radially inner surface of said shoulder is greater than the radius of the smaller diameter end of the molded part, and the end surface of the recessed molded section of said carrier member adjacent said shoulder and located rearwardly from it in the upward direction of travel is disposed obliquely to the plane of said semicircular shoulder and slopes outwardly and downwardly from the inner surface of the recessed molded portion of said carrier member in its upward travel position on said conveying means whereby molded parts picked up by said carrier member with the smaller diameter end thereof directed downwardly will not be supported on said semicircular shoulder because of its radius dimension and will be supported on said obliquely disposed end surface and as a result the molded part will be displaced out of said carrier member during the course of its upward travel on said conveying means.

8. A device, as set forth in claim 1, wherein said carrier members having openings therethrough on the longitudinal center line of the recessed molded sections therein and spaced from the transverse ends of the recessed molded sections, ejector means positioned intermediate the upper and lower ends of said means for conveying molded parts and said means arranged to cooperate with the openings on the longitudinal center line of said carrier members for displacing molded parts from the recessed molded sections before the molded parts have completed their upward travel at the point where they are displaced to the processing station, and control means arranged to activate said ejector means and positioned between the upper ends of said conveying means and the processing station for activating said ejector means to avoid overloading the supply of molded parts to the processing station.

9. A device for transferring molded parts from a storage container to a processing station comprising means for conveying molded parts in an upward path from the storage container, carrier members removably secured to said means and arranged to receive individual molded parts for retaining the molded parts during the upward passage of said means, each of said carrier members comprising at least one recessed molded section having a configuration within the recessed molded section conforming to the shape of a substantial portion of the exterior periphery of the molded part being conveyed, each of said carrier members having at least one groove extending through each said molded section from the leading end thereof in the direction of travel of said means for conveying molded parts, at least one ejector member located adjacent the upper end of said endless conveyor member, each said ejector member disposed in alignment with one of said grooves in the molded section of said carrier member whereby as said carrier member travels upwardly on said means for conveying molded parts past the upper end thereof said ejector member extends into said groove and ejects any molded parts situated within the recessed molded section of said carrier member.

10. A device, as set forth in claim 9, wherein a feed trough having an upper inlet end located adjacent the upper end of said means for conveying molded parts and being inclined downwardly therefrom to a lower discharge end, said trough comprising a bottom plate and a pair of side plates, whereby said feed trough is arranged to receive molded parts ejected from said carrier members by said ejector member and to guide the molded parts to said lower discharge end thereof.

11. A device, as set forth in claim 10, wherein said bottom plate of said trough having a plurality of longitudinally extending laterally spaced rows of bores therethrough with said rows of bores extending in the direction of travel of said trough, a plurality of longitudinally extending partitions extending upwardly from said bottom plate and oriented thereon in the direction of travel of said trough, and pins extending through the bores in said bottom plate into the lower ends of said partitions for securing said partitions on said bottom plate, whereby due to the laterally spaced rows of bores through said bottom plate the location of said partitions can be adjusted in laterally spaced positions for forming a plurality of downwardly extending tracks in said feed trough in accordance with the size of the molded parts being conveyed.

12. A device, as set forth in claim 10, wherein said feed trough has an upper portion inclined obliquely to the vertical and a lower portion depending vertically downward from the lower end of said upper portion.

13. A device, as set forth in claim 10, wherein said feed trough comprises a selectively engageable locking mechanism mounted at said discharge end thereof for holding molded parts in position prior to releasing them from said feed trough.

14. A device, as set forth in claim 10, wherein a cover plate is spaced above said bottom plate on said feed trough forming a guide for the passage of the molded parts downwardly through said feed trough and for preventing the molded parts from being displaced from said feed trough.

15. A device, as set forth in claim 10, wherein a second conveyor is aligned below said discharge end of said feed trough and is arranged to receive the molded parts from said feed trough, and means for moving said second conveyor in a step wise fashion corresponding to the transverse dimension of the molded parts discharged from said feed trough.

16. A device, as set forth in claim 15, wherein separators are positioned transversely on said second conveyor for separating adjacent molded parts deposited thereon.

17. A device, as set forth in claim 16, wherein a third conveyor being disposed in side-by-side relationship with said second conveyor, and transfer means being arranged for displacing molded parts from said second conveyor to said third conveyor.

18. A device, as set forth in claim 17, wherein each of said separators having at least one slot extending inwardly from each of its sides in parallel relationship with the surface of said second conveyor, said transfer means comprising guide rods located at the transfer point from said second to said third conveyor, said guide rods being arranged whereby said separators slide over said guide rods as said second conveyor moves away from said discharge end of said feed trough, and at least a portion of said guide rods being disposed obliquely to the direction of travel of said second and third conveyors for guiding the molded parts from said second to said third conveyor.

19. A device, as set forth in claim 10, wherein a second conveyor is aligned below said discharge end of said feed trough and is arranged to receive the molded parts released from said feed trough, a conveyor screw member mounted above said second conveyor belt and being arranged to receive the molded parts as they are discharged from said feed trough and for moving the molded parts along said second conveyor belt to the end of said screw conveyor.